US012631351B2

(12) United States Patent
Kawagoshi et al.

(10) Patent No.: US 12,631,351 B2
(45) Date of Patent: May 19, 2026

(54) AIR PURIFIER

(71) Applicant: SHARP KABUSHIKI KAISHA, Sakai City (JP)

(72) Inventors: Takaki Kawagoshi, Sakai City (JP); Noriaki Taguchi, Sakai City (JP); Masafumi Sakamoto, Sakai City (JP); Tatsufumi Atsumi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 488 days.

(21) Appl. No.: 18/103,810

(22) Filed: Jan. 31, 2023

(65) Prior Publication Data

US 2023/0243531 A1 Aug. 3, 2023

(30) Foreign Application Priority Data

Feb. 2, 2022 (JP) .................................. 2022-014578

(51) Int. Cl.
*F24F 8/15* (2021.01)
*B01D 53/88* (2006.01)

(52) U.S. Cl.
CPC .............. *F24F 8/15* (2021.01); *B01D 53/885* (2013.01); *B01D 2255/802* (2013.01)

(58) Field of Classification Search
CPC .... F24F 8/15; F24F 8/167; F24F 8/158; F24F 8/22; F24F 13/28; B01D 53/885; B01D 2255/802; B01D 46/0005; B01D 46/0027; B01D 46/523; B01D 39/1623; B01D 2239/0407; B01D 2253/102; B01D 2255/20707; B01D 2255/20776; B01D 2257/304; B01D 2257/406; B01D 2257/90; B01D 2258/06; B01D 2259/804; Y02A 50/20
See application file for complete search history.

(56) References Cited

U.S. PATENT DOCUMENTS

| | | | |
|---|---|---|---|
| 11,690,930 B2 | 7/2023 | Watanabe et al. | |
| 2021/0060199 A1 | 3/2021 | Somei et al. | |
| 2021/0093745 A1 * | 4/2021 | Watanabe ................. A61L 9/18 |

FOREIGN PATENT DOCUMENTS

| | | | | |
|---|---|---|---|---|
| CN | 204159211 U | * | 2/2015 | |
| CN | 104684629 A | * | 6/2015 | .............. F24F 8/167 |
| CN | 204629773 U | * | 9/2015 | |
| CN | 109477652 A | | 3/2019 | |
| CN | 111405942 A | | 7/2020 | |
| JP | 2001293072 A | * | 10/2001 | |
| JP | 2001-340441 A | | 12/2001 | |
| JP | 2002263175 A | * | 9/2002 | |

(Continued)

*Primary Examiner* — Regina M Yoo
(74) *Attorney, Agent, or Firm* — ScienBiziP, P.C.

(57) ABSTRACT

An air purifier includes a housing that includes an intake port and an exhaust port, a filter unit that includes a photocatalytic filter and is housed in a unit housing within the housing, a light source that exposes the photocatalytic filter to light, and a blast fan that generates a flow of air passing through the unit housing. The photocatalytic filter is formed in a wavy shape in which ridge portions and trough portions extending in a first direction are alternately arranged in a second direction orthogonal to the first direction, and the photocatalytic filter is housed in the unit housing such that the flow of air flows along the first direction.

7 Claims, 12 Drawing Sheets

(56) References Cited

FOREIGN PATENT DOCUMENTS

| | | | | | | |
|----|------------|----|---|---------|------------|------------|
| JP | 2004033648 | A  | * | 2/2004  | | |
| JP | 2007-245037| A  |   | 9/2007  | | |
| JP | 2009-183919| A  |   | 8/2009  | | |
| JP | 2011000512 | A  | * | 1/2011  | | |
| JP | 2016-036475| A  |   | 3/2016  | | |
| JP | 2021-037285| A  |   | 3/2021  | | |
| JP | 2021-151433| A  |   | 9/2021  | | |
| KR | 200328357  | Y1 | * | 9/2003  | ............. | B01D 39/14 |
| WO | WO-03086793| A1 | * | 10/2003 | ........... | B60H 3/0658 |

* cited by examiner

THIRD DIRECTION

FIRST DIRECTION

SECOND DIRECTION

THIRD DIRECTION

FIRST DIRECTION

SECOND DIRECTION

AIR PURIFIER

BACKGROUND OF THE INVENTION

Field of the Invention

The present disclosure relates to an air purifier, in particular, to an air purifier that purifies air by using, for example, a photocatalytic filter carrying photocatalyst.

Description of the Background Art

There is an air purifier (photocatalytic device) equipped with a housing, a filter unit (photocatalytic unit) that includes a flat photocatalytic filter (photocatalytic sheet) and is placed in the housing, a light source (light) for providing light to the photocatalytic filter, and a blast fan for blowing air over the surface of the photocatalytic filter. Also, such an air purifier may be an air purifier that includes a filter unit disposed to be attachable and detachable with respect to a housing.

The conventional air purifier described above uses the flat photocatalytic filter, and thus in order to achieve sufficient decomposition performance of organic matter (i.e., air purification performance), the size of the photocatalytic filter needs to be increased, which may cause the size of the device to be increased.

Thus, a main object of the present disclosure is to provide a new air purifier.

Another object of the present disclosure is to provide an air purifier that can effectively purify air and can be reduced in size.

SUMMARY OF THE INVENTION

A first disclosure is an air purifier that purifies air by using a photocatalytic filter carrying photocatalyst, the air purifier including: a housing that includes an intake port and an exhaust port; a filter unit that includes the photocatalytic filter and is housed in a unit housing within the housing; a light source that exposes the photocatalytic filter to light; and a blast fan that generates a flow of air passing from the intake port through the unit housing toward the exhaust port. The photocatalytic filter is formed in a wavy shape in which ridge portions and trough portions extending in a first direction are alternately arranged in a second direction orthogonal to the first direction, and the photocatalytic filter is housed in the unit housing such that the flow of air flows along the first direction.

According to the first disclosure, the photocatalytic filter is formed in a wavy shape, and thus the contact area of the photocatalytic filter with the air can be increased while the size of the photocatalytic filter is prevented from being increased. Also, the air can flow along the first direction that is the direction in which the ridge portions and the trough portions of the photocatalytic filter extend, and thus a pressure loss can be appropriately reduced. Consequently, the size of the blast fan can be also reduced. As a result, the air can be efficiently purified and the size of the air purifier can be reduced.

A second disclosure depends from the first disclosure. The filter unit includes a holding frame, the holding frame has, at both end portions in the first direction of the photocatalytic filter, first frames that keep the wavy shape of the photocatalytic filter, and the first frames include first openings through which the flow of air passes in the first direction.

According to the second disclosure, the air can appropriately flow along the main surface (surface) of the photocatalytic filter while the wavy shape of the photocatalytic filter is appropriately maintained.

A third disclosure depends from the second disclosure. The filter unit is attachable and detachable with respect to the unit housing, the unit housing includes unit guides supporting the first frame such that the first frame is slidable and guiding attachment and detachment of the filter unit, and the unit guides include a second opening in communication with the first openings.

According to the third disclosure, the air can appropriately flow along the main surface of the photocatalytic filter while the filter unit is appropriately guided to the mounting position.

A fourth disclosure depends from the second disclosure. The holding frame includes second frames formed in a long plate, disposed both end portions in the second direction of the photocatalytic filter, and extending in the first direction, and the flow of air is formed by the second frames.

According to the fourth disclosure, the diffusion of the flow of air in the second direction (that is, toward the outside in the width direction of the photocatalytic filter) can be restricted by the second frame, and thus the photocatalytic filter and the air can be brought into contact more appropriately.

A fifth disclosure depends from the second disclosure. The first frame is formed in a wavy shape extending along an end portion of the photocatalytic filter.

According to the fifth disclosure, the air can more appropriately flow along the main surface of the photocatalytic filter.

A sixth disclosure depends from the fifth disclosure. The holding frame includes interval regulation portions that regulate the first frame such that a wave spacing is a predetermined spacing.

According to the sixth disclosure, even in a case where the filter unit has stretchability in the second direction, the wave spacing of the first frame (further, the photocatalytic filter) can be uniformly maintained.

A seventh disclosure depends from the fifth disclosure. The unit housing includes unit guides supporting the first frame such that the first frame is slidable and guiding attachment and detachment of the filter unit, the unit guides each include an engagement portion formed in the center in an insertion direction of the filter unit, and the first frame includes positioning projections projecting outward of the photocatalytic filter and engaged with the engagement portion.

According to the seventh disclosure, even in a case where the filter unit has stretchability in the second direction, the wave spacing of the first frame (further, the photocatalytic filter) can be uniformly maintained.

An eighth disclosure depends from the fifth disclosure. The unit housing includes unit guides supporting the first frame such that the first frame is slidable and guiding attachment and detachment of the filter unit, and each of the unit guide and the first frame is formed such that a width decreases toward a back side in an insertion direction of the filter unit.

According to the eighth disclosure, even in a case where the filter unit has stretchability in the second direction, the wave spacing of the first frame (further, the photocatalytic filter) can be uniformly maintained.

A ninth disclosure depends from the first disclosure. The light source includes a first light source that exposes one main surface of the photocatalytic filter to the light and a second light source that exposes the other main surface of the photocatalytic filter to the light.

According to the ninth disclosure, the light is applied from both sides of the filter unit, and thus the air can more efficiently purified.

According to the present disclosure, the contact area of the photocatalytic filter with the air can be increased and a pressure loss can be appropriately reduced. Therefore, the air can be efficiently purified and the size of the air purifier can be reduced.

The aforementioned objects, other objects, features, and advantages of the present disclosure will be even more clear from the detailed descriptions of embodiments described below with reference to the drawings.

DESCRIPTION OF THE PREFERRED EMBODIMENTS

First Embodiment

Figure 1:
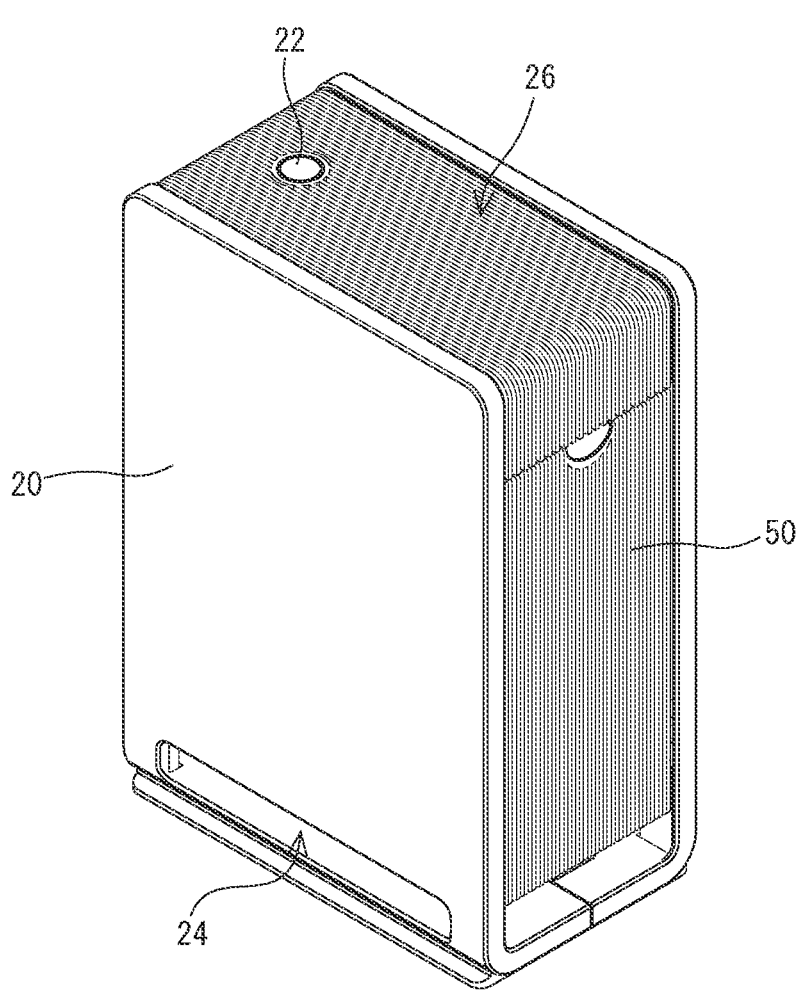
FIG. 1 is a perspective view illustrating an air purifier according to a first embodiment of the present disclosure.
Figure 2:
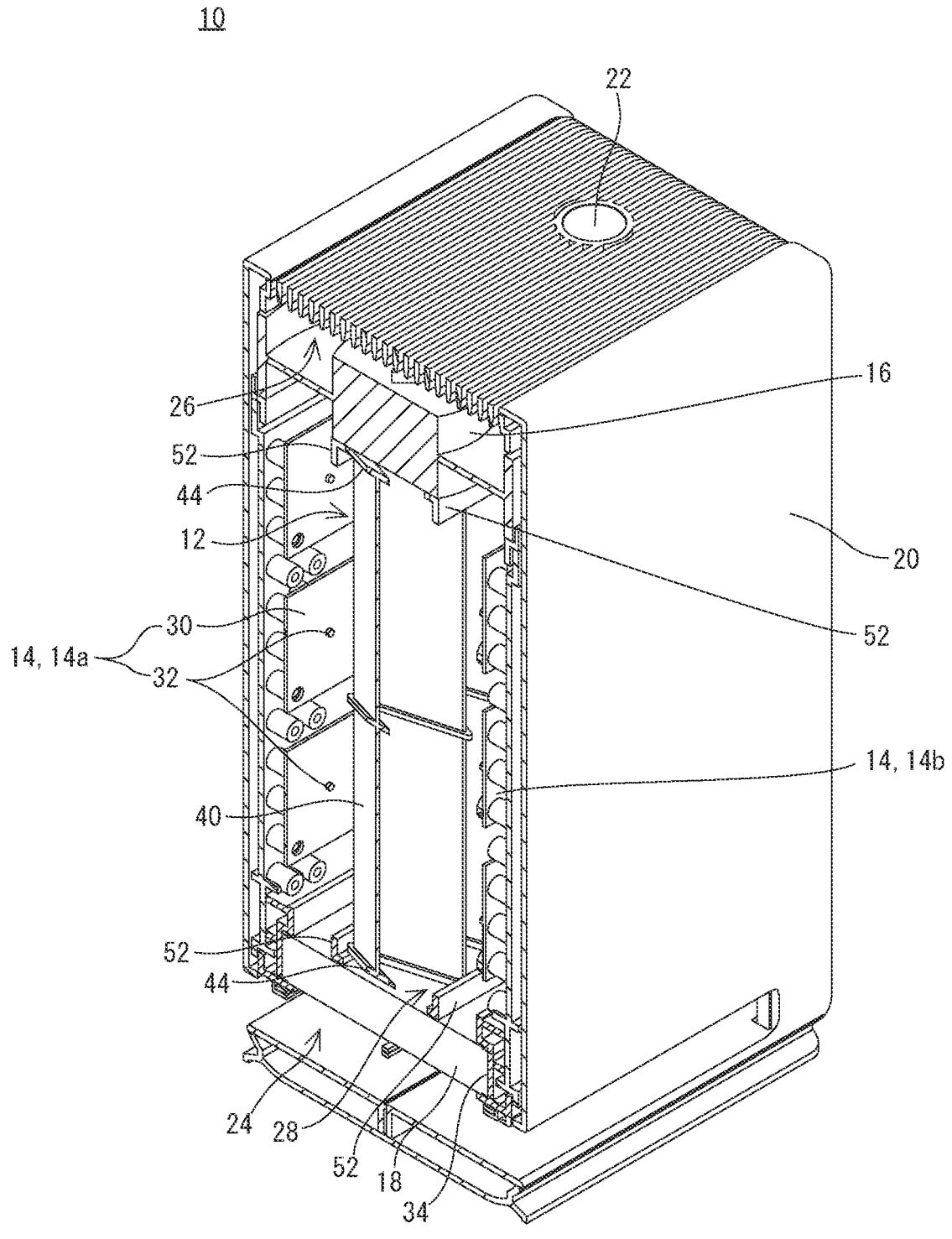
FIG. 2 is a vertical cross-sectional view illustrating the inner structure of the air purifier.

Referring to FIGS. 1 and 2, an air purifier 10 according to a first embodiment of the present disclosure is a device that decomposes and purifies harmful substances in the air by using a photocatalytic filter 40 carrying photocatalyst. As described in detail below, the air purifier 10 decomposes and purifies organic substances (organic compounds) adhered to the photocatalytic filter 40 by flowing air taken in from the outside along a main surface (surface) of the photocatalytic filter 40 and exposing the photocatalytic filter 40 to light. Hereinafter, the structure of the air purifier 10 will be described in detail.

Figure 3:
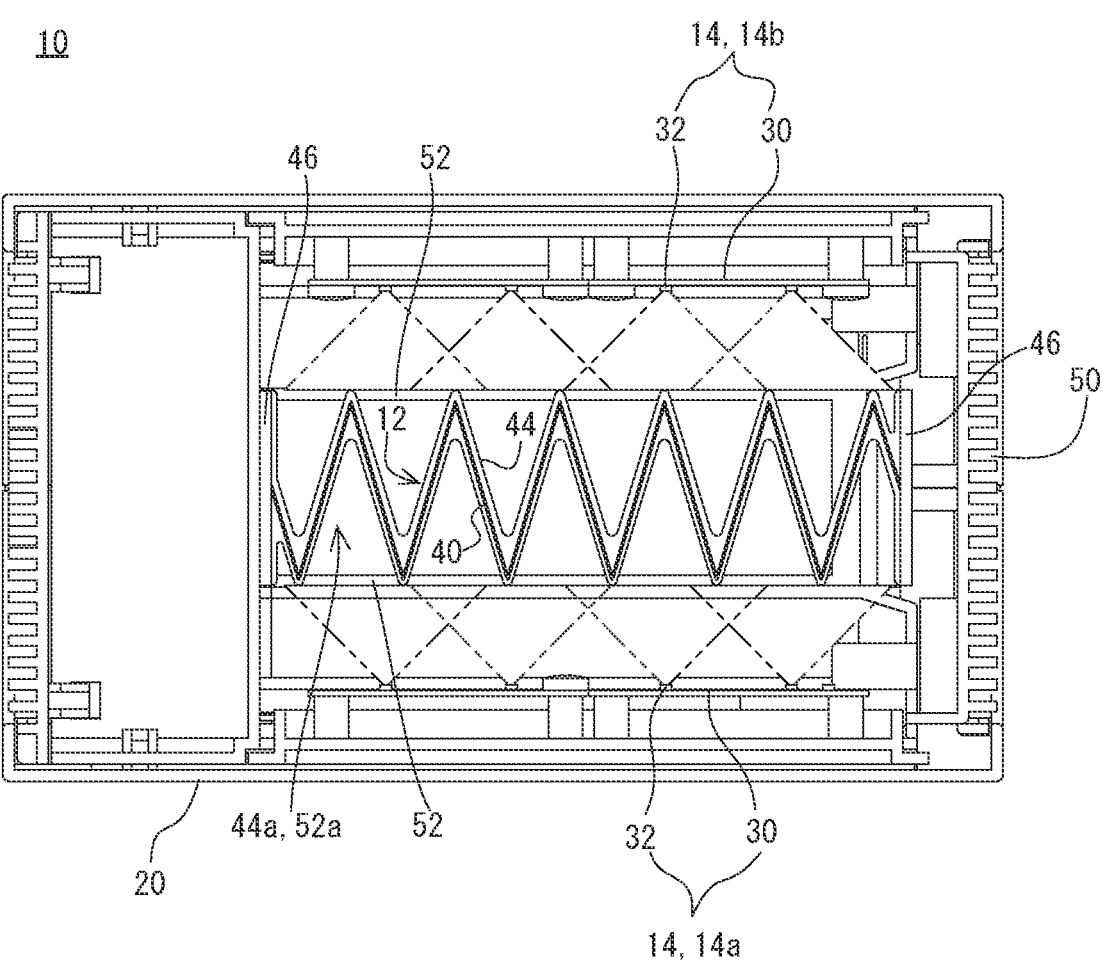
FIG. 3 is a transverse cross-sectional view illustrating the inner structure of the air purifier.

As illustrated in FIGS. 1 to 3, the air purifier 10 is provided with a filter unit 12 including the photocatalytic filter 40 and a holding frame 42, a light source 14, a blast fan 16, an activated carbon filter 18, and a controller (not illustrated), and these components are built into a housing 20 in a predetermined arrangement manner. The controller includes a CPU and a memory, etc. and controls operation of each component (the light source 14 and the blast fan 16, etc.) of the air purifier 10 based on an input operation into an operation unit including a power button 22, etc.

The housing 20 is formed in a rectangular shape. An intake port 24 is disposed in a bottom portion of the housing 20, and an exhaust port 26 is disposed in a top portion of the housing 20. Additionally, a unit housing 28 is disposed in the center of the housing 20. The filter unit 12 is housed (mounted) vertically in the unit housing 28. The structure of the filter unit 12 will be descried in detail below.

The light source 14 includes a substrate 30 and a plurality of LEDs (light emitting diodes) 32 disposed in a dispersed manner on a surface of the substrate 30, and is disposed opposed to the main surface of the photocatalytic filter 40. In the present embodiment, the light source 14 includes a first light source 14a disposed opposed to one main surface of the photocatalytic filter 40 and a second light source 14b disposed opposed to the other main surface of the photocatalytic filter 40. In other words, the light sources 14 are disposed on both sides in a thickness direction of the filter unit 12 and can expose each of the main surfaces of the photocatalytic filter 40 to light. For example, twelve LEDs 32 are disposed on each of the first light source 14a and the second light source 14b.

The blast fan 16 is dispose at an upper portion of the housing 20, that is, between the exhaust port 26 and the unit housing 28 (i.e., the filter unit 12) to generate an upward air flow flowing upward from the intake port 24 through the unit housing 28 toward the exhaust port 26. In other words, the air taken from the intake port 24 into the housing 20 by driving of the blast fan 16 flows upward through the unit housing 28 and is thereafter discharged from the exhaust port 26 to the outside of the housing 20. A known fan of axial fans such as a propeller fan and a centrifugal fan may be applied as the blast fan 16.

Additionally, an activated carbon filter housing 34 is disposed at a lower portion of the housing 20, that is, between the intake port 24 and the unit housing 28. The activated carbon filter 18 is disposed transversely in the activated carbon filter housing 34 so as to cover the intake port 24. In other words, the air taken from the intake port 24 into the housing 20 passes in a thickness direction of the activated carbon filter 18 (i.e., passes through the activated carbon filter 18) and thereafter flows into the unit housing 28. The activated carbon filter 18 is a filter in which activated carbon is carried on a porous base material such as a nonwoven fabric of synthetic resin, and the filter absorbs via activated carbon odor components such as ammonia and hydrogen sulfide contained in the air and removes the odor components.

Figure 4:
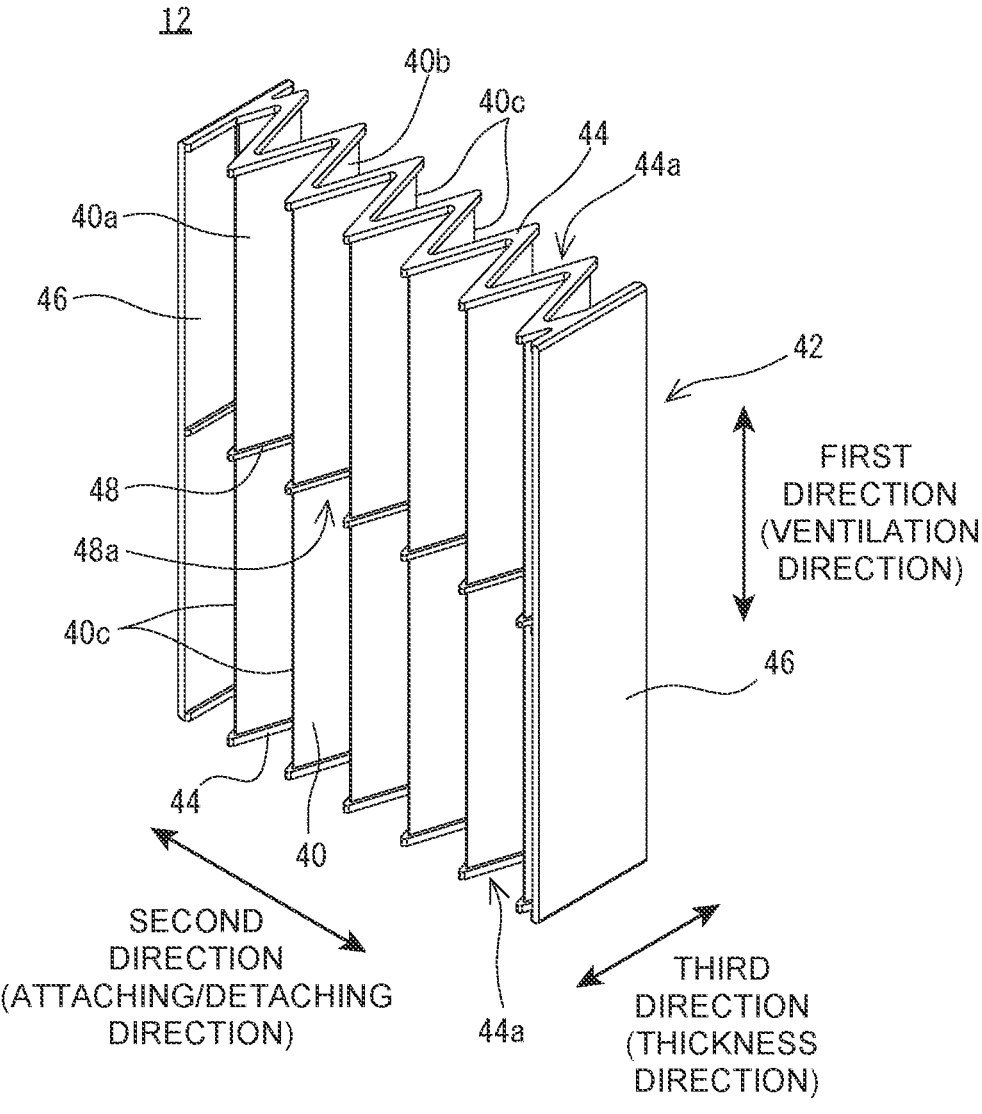
FIG. 4 is a perspective view illustrating a filter unit.

Next, the structure of the filter unit 12 will be described. As illustrated in FIG. 4, the filter unit 12 includes the photocatalytic filter 40 and the rectangular holding frame 42 that holds the photocatalytic filter 40. The photocatalytic filter 40 and the holding frame 42 are integrally molded.

The photocatalytic filter 40 is a filter in which activated carbon is carried on a porous base material such as a nonwoven fabric of synthetic resin, and has flexibility. Photocatalysts included in the photocatalytic filter 40 are excited by irradiation of light such as ultraviolet light to generate active oxygen species, remove (sterilize, purify) bacteria contained in the air with the active oxygen species, and decompose (deodorize) odor components. Known photocatalysts such as titanium dioxide and tungsten oxide may be used as photocatalysts, and of the photocatalysts, titanium dioxide is preferably used.

In addition, the photocatalytic filter 40 is formed in a wave shape (also referred to as a pleats or bellows) in which ridge portions 40*a* and trough portions 40*b* that extend in a first direction are alternately arranged in a second direction orthogonal to the first direction. In the present embodiment, the photocatalytic filter 40 is formed in a triangular wave shape with folds 40*c* formed at projecting ends (tops and bottoms) of the ridge portions 40*a* and the trough portions 40*b*, and a plurality of folds 40*c* extend in the first direction. The photocatalytic filter 40 is formed in a wavy shape as just described, and thus the size of the photocatalytic filter 40 can be prevented from being increased and the contact area of the photocatalytic filter 40 with the air can be increased.

The holding frame 42 includes first frames 44 and second frames 46 that hold the four sides of the photocatalytic filter 40. The holding frame 42 is formed of synthetic resin such as ABS resin or PC/ABS alloy formed by mixing ABS resin with polycarbonate.

The first frames 44 are each a portion of the photocatalytic filter 40 for retaining the wavy shape of the photocatalytic filter 40 and are disposed so as to cover both end portions in the first direction of the photocatalytic filter 40. The first frame 44 includes openings 44*a* (first openings) that allow the flow of air to pass in the first direction and is configured so as not to disturb the flow of air by the blast fan 16. Specifically, the first frame 44 is formed in a wavy shape extending along the end portion in the first direction of the photocatalytic filter 40 (i.e., in a wavy shape extending in the second direction), and includes the triangular openings 44*a* formed between inclined sections that form the wave (ridges and troughs).

The second frames 46 are disposed at both end portions in the second direction of the photocatalytic filter 40. The second frames 46 are each formed in a rectangular long plate extending in the first direction and connects end portions of the first frame 44. The second frame 46 forms a ventilation passage extending in the first direction and restricts the flow of air from diffusing in the second direction (i.e., toward the outside in the width direction of the photocatalytic filter 40).

Also, the holding frame 42 further includes a third frame 48 disposed so as to sandwich the center in the first direction of the photocatalytic filter 40. The third frame 48 is a portion for retaining the wavy shape of the photocatalytic filter 40 in the same manner as the first frame 44 and includes openings 48*a* that allow the flow of air to pass in the first direction. In the present embodiment, the third frame 48 is formed in a wavy shape extending in the second direction along the main surface of the photocatalytic filter 40.

Figure 5:
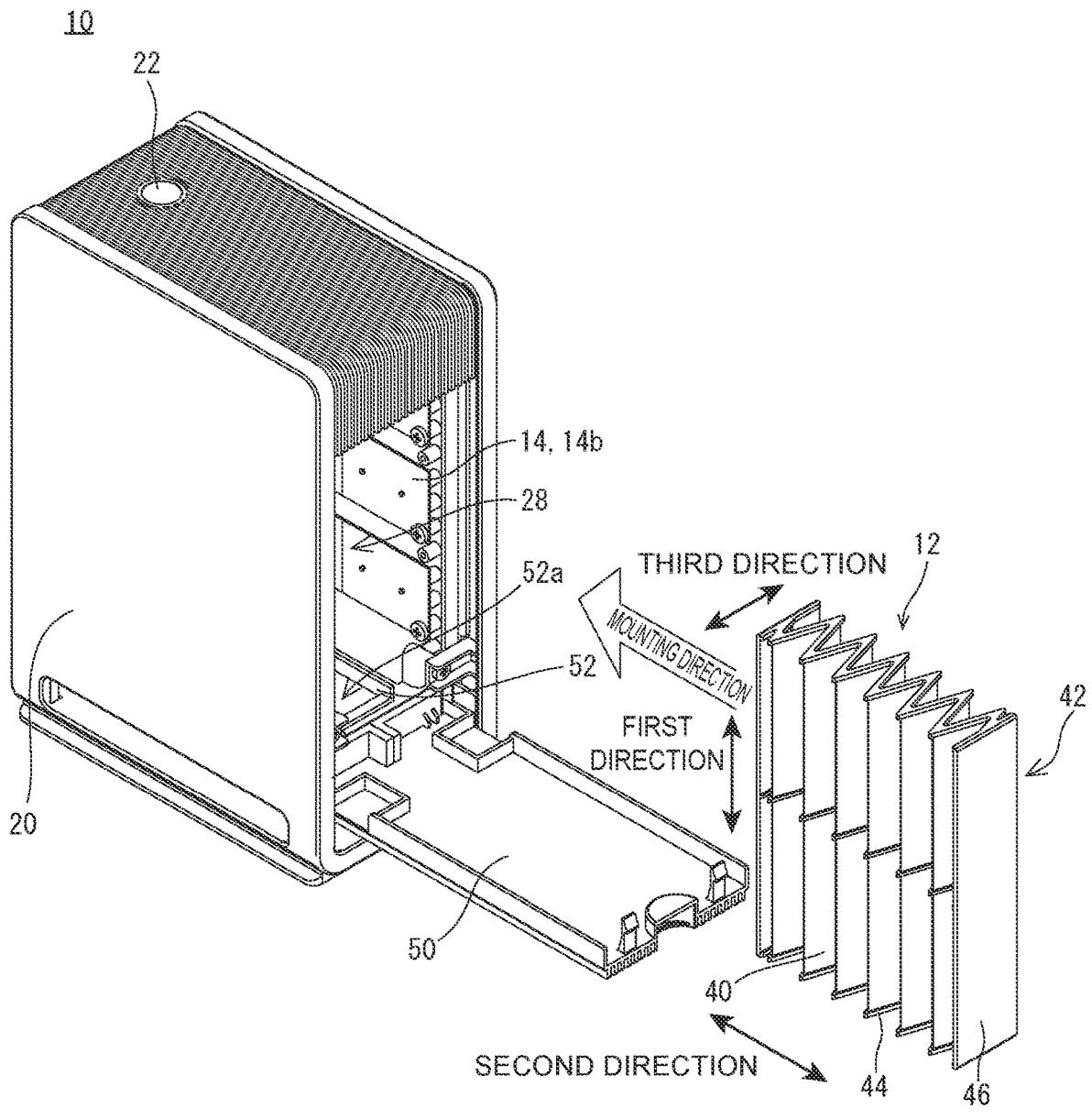
FIG. 5 is a diagram illustrating how to mount the filter unit into a housing of the air purifier.

By, as illustrated in FIG. 5, opening an opening/closing cover 50 disposed at one side surface of the housing 20, such a filter unit 12 can be attached/detached with respect to the unit housing 28.

In addition, in the embodiment, as can be clearly seen in FIGS. 2 and 5, the filter unit 12 (the photocatalytic filter 40) is housed in the unit housing 28 such that the flow of air by the blast fan 16 flows along the first direction (i.e., the direction in which the fold 40*c* of the photocatalytic filter 40 extends). In other words, the filter unit 12 is housed vertically in the unit housing 28 such that the first direction is an up-down direction, and the flow of air by the blast fan 16 flows along the main surfaces of the photocatalytic filter 40.

Also, unit guides 52 that guide attachment and detachment of the filter unit 12 are disposed in the unit housing 28, and the filter unit 12 is guided to the mounting position by the unit guides 52. The unit guides 52 include an opening 52*a* (a second opening) in communication with the openings 44*a* of the first frame 44 and are configured so as not to disturb the flow of air by the blast fan 16. Specifically, a pair of unit guides 52 are disposed respectively on an upper end portion and a lower end portion of the unit housing 28 at a predetermined interval in the thickness direction of the filter unit 12 (a third direction orthogonal to the first direction and the second direction), and extend in an attaching/detaching direction (the second direction) of the filter unit 12. Each of the unit guides 52 is formed in a cross-sectional L-shape and supports the first frame 44 such that the first frame 44 included in the filter unit 12 is slidable. The opening 52*a* is formed between the pair of unit guides 52, and the opening 52*a* is in communication with the openings 44*a* in a state where the filter unit 12 is mounted in the unit housing 28.

In the air purifier 10 as described above, when the power button 22 is turned on, the controller drives the blast fan 16 and turns on the light source 14 (LEDs 32), and thus each of the main surfaces of the photocatalytic filter 40 are exposed to the light. Odor components are firstly absorbed and removed by the activated carbon filter 18 from the air taken from the intake port 24 into the housing 20 along with driving of the blast fan 16. Next, the air passed through the activated carbon filter 18 flows upward through the unit housing 28 along the main surfaces of the photocatalytic filter 40. By contacting of the photocatalytic filter 40 with the air, organic substances adhered to the photocatalytic filter 40 are decomposed by a photocatalytic action and thus the air is purified. Then, the clean air purified by the photocatalytic filter 40 is discharged from the exhaust port 26 to the outside of the housing 20.

In this case, the photocatalytic filter 40 is formed in a wavy shape, which increases the contact area of the photocatalytic filter 40 with the air, and thus the air can be efficiently purified. Further, the air does not flow in a thickness direction of the photocatalytic filter 40 but flows along the main surfaces of the photocatalytic filter 40, and thus a pressure loss can be reduced. In particular, the air flows along the first direction that is the direction in which the ridge portions 40*a* and the trough portions 40*b* of the photocatalytic filter 40 extend, and thus a pressure loss can be more appropriately reduced. Furthermore, the air flows along the main surfaces of the photocatalytic filter 40 and the main surfaces of the photocatalytic filter 40 are exposed to the light by using the first light source 14*a* and the second light source 14*b*, and thus the air can be more efficiently purified. Moreover, the first frame 44 includes the openings 44*a* and the unit guides 52 include the opening 52*a*. Therefore, the air can appropriately flow along the main surfaces of the photocatalytic filter 40 while the first frames 44 and the unit guides 52 do not disturb the flow of air.

As described above, according to the first embodiment, the photocatalytic filter 40 is formed in a wavy shape; therefore, the size of the photocatalytic filter 40 can be prevented from being increased and the contact area of the photocatalytic filter 40 with the air can be increased. Additionally, the air flows along the first direction that is the direction in which the ridge portions 40*a* and the trough portions 40*b* of the photocatalytic filter 40 extend, and thus a pressure loss can be appropriately reduced. Therefore, the size of the blast fan 16 can be also reduced. As a result, the air can be efficiently purified and the size of the air purifier 10 can be reduced.

Note that the structure of the aforementioned filter unit 12 is merely an example, and its specific structure can be changed as needed. For example, in forming the photocatalytic filter 40 in a wavy shape, the photocatalytic filter can be formed in a sinusoidal or rectangular wave shape, etc., rather than in a triangular wave shape.

Figure 6:
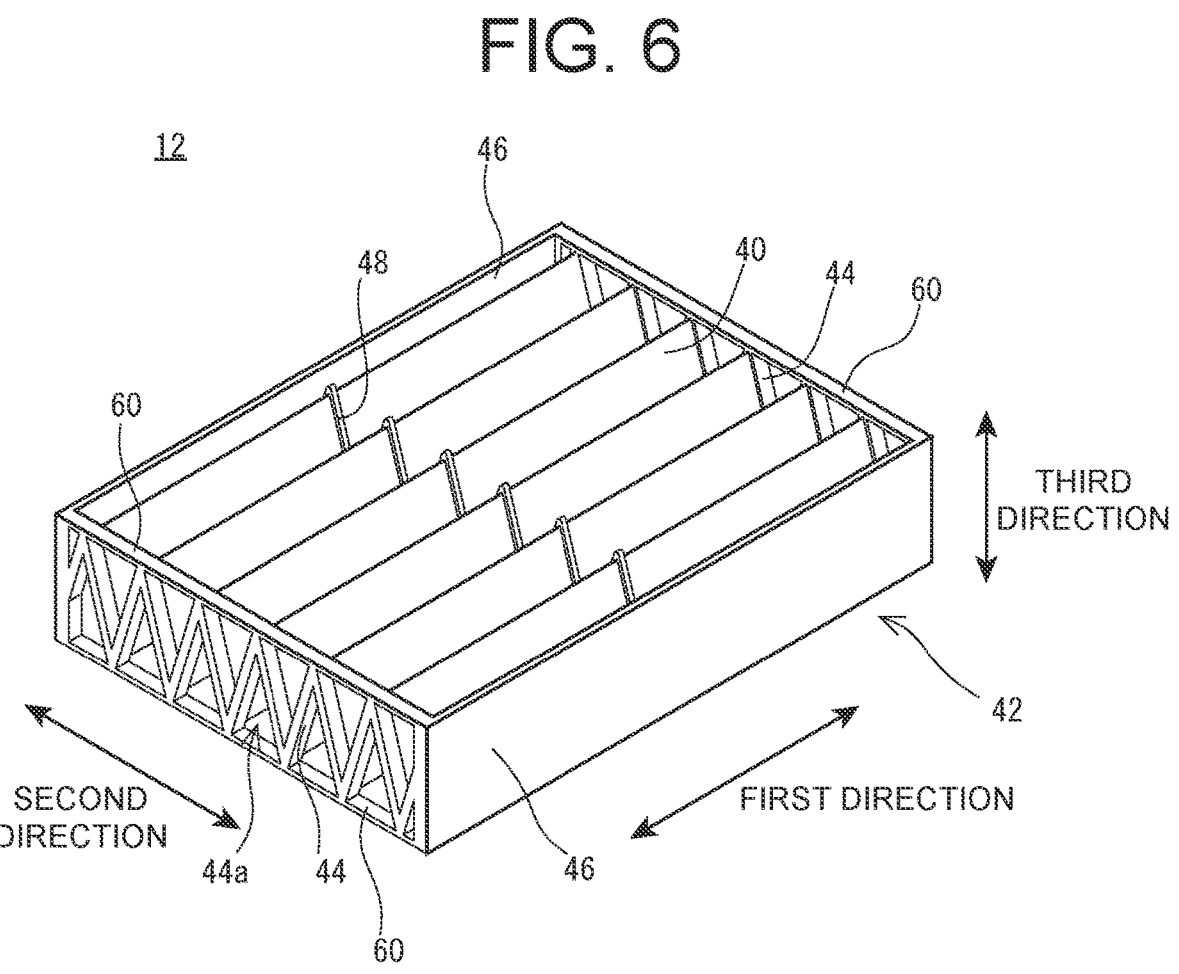
FIG. 6 is a perspective view illustrating another example of the filter unit.

Also, as illustrated in FIG. 6, interval regulation portions 60 can be formed on the holding frame 42. The interval regulation portions 60 are formed so as to linearly connect the respective projecting ends of the ridge portion and the trough portion of the first frame 44 in the second direction and regulate the first frame 44 (furthermore, the photocatalytic filter 40) such that the wave spacing (pitch between the ridges/troughs) thereof is a predetermined spacing. When the first frame 44 is formed in a triangular wave shape, the filter unit 12 (the first frame 44 and the photocatalytic filter 40) has stretchability in the second direction. Accordingly, in this case, the wave spacing of the first frame 44 may have variations. However, the interval regulation portions 60 are disposed, and thus the wave spacing of the first frame 44 (furthermore, the photocatalytic filter 40) can be uniformly maintained.

Figure 7:
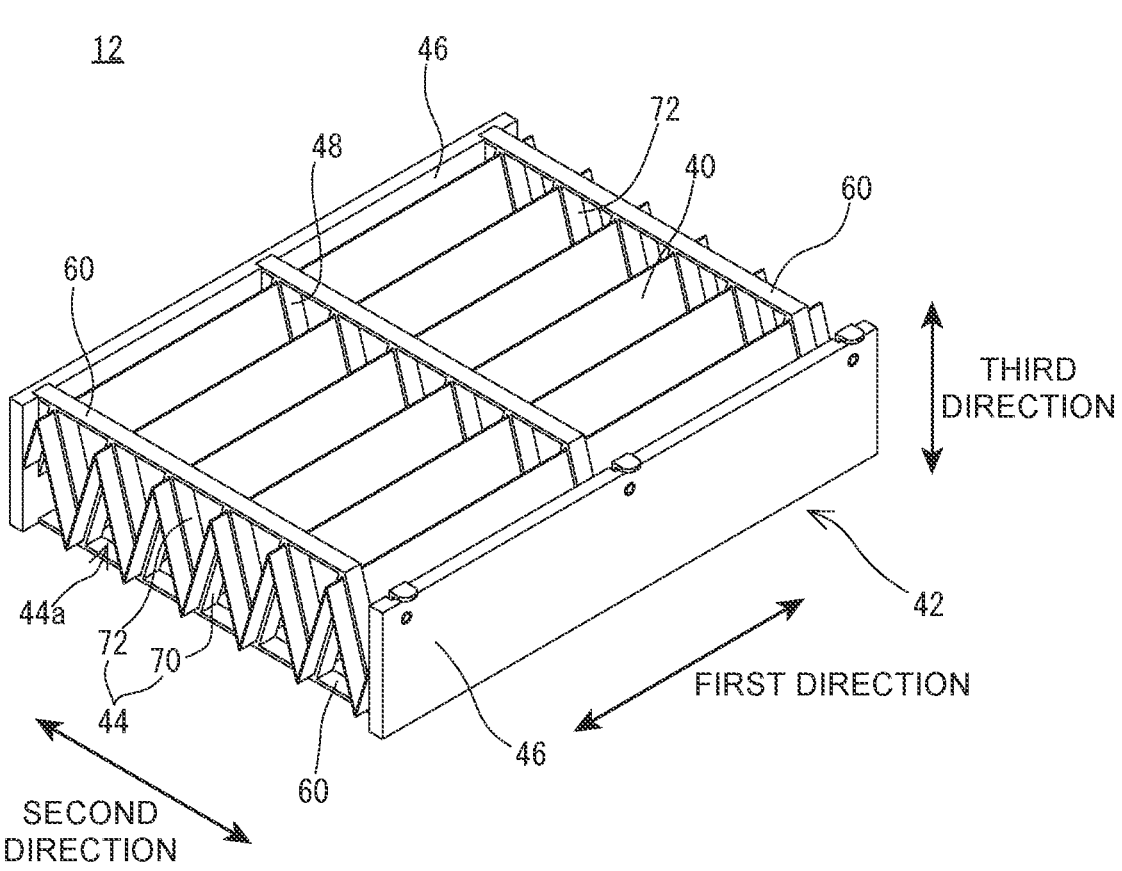
FIG. 7 is a perspective view illustrating still another example of the filter unit.
Figure 8:
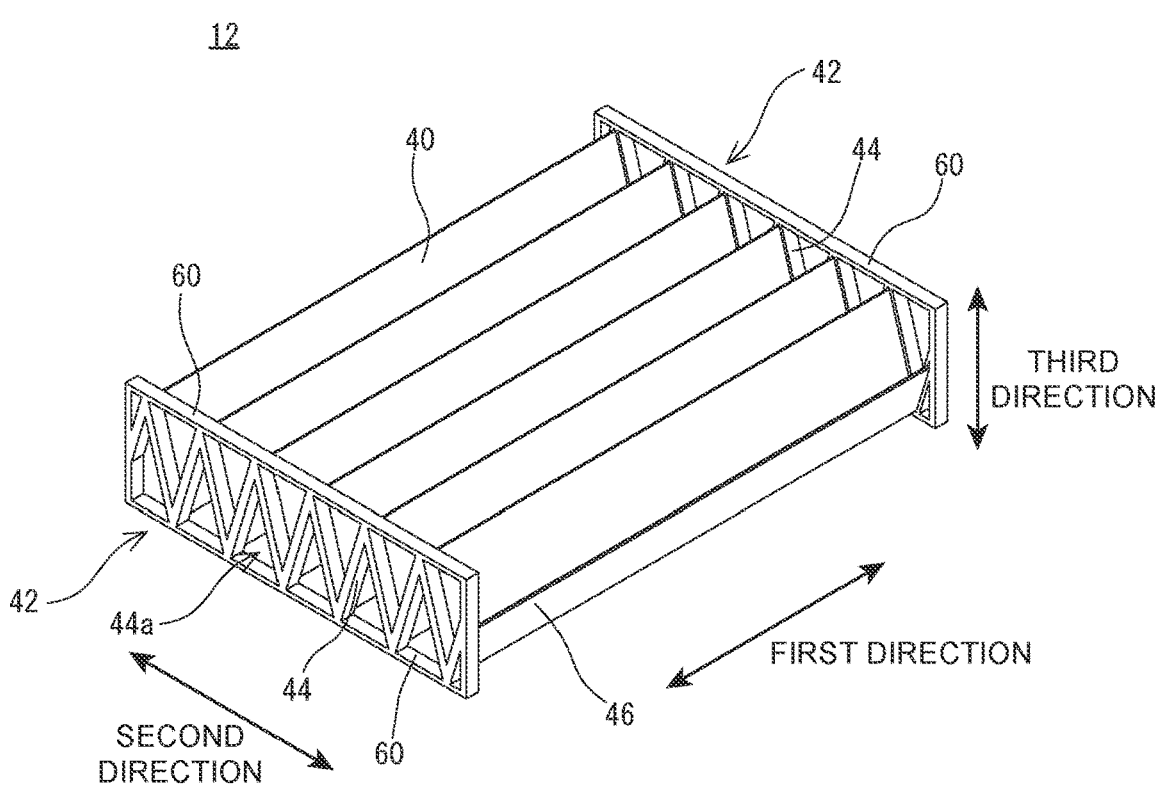
FIG. 8 is a perspective view illustrating yet another example of the filter unit.

Further, the photocatalytic filter 40 and the holding frame 42 may not be integrally molded. Alternatively, the photocatalytic filter 40 and the holding frame 42 are separately manufactured to be assembled and thereby can be integrated. For example, as illustrated in FIG. 7, the first frame 44 (as well as the third frame 48) is formed of a first divided portion 70 and a second divided portion 72 that are separable from each other, and the photocatalytic filter 40 is tucked in the first divided portion 70 and the second divided portion 72 to be fixed thereby. As a result, the photocatalytic filter 40 and the holding frame 42 can be integrated. Furthermore, as illustrated in FIG. 8, the second frames 46 are omitted, and the first frames 44 separately manufactured are fitted into the both end portions in the first direction of the photocatalytic filter 40. Therefore, the photocatalytic filter 40 and the holding frame 42 can be integrated.

Figure 9:
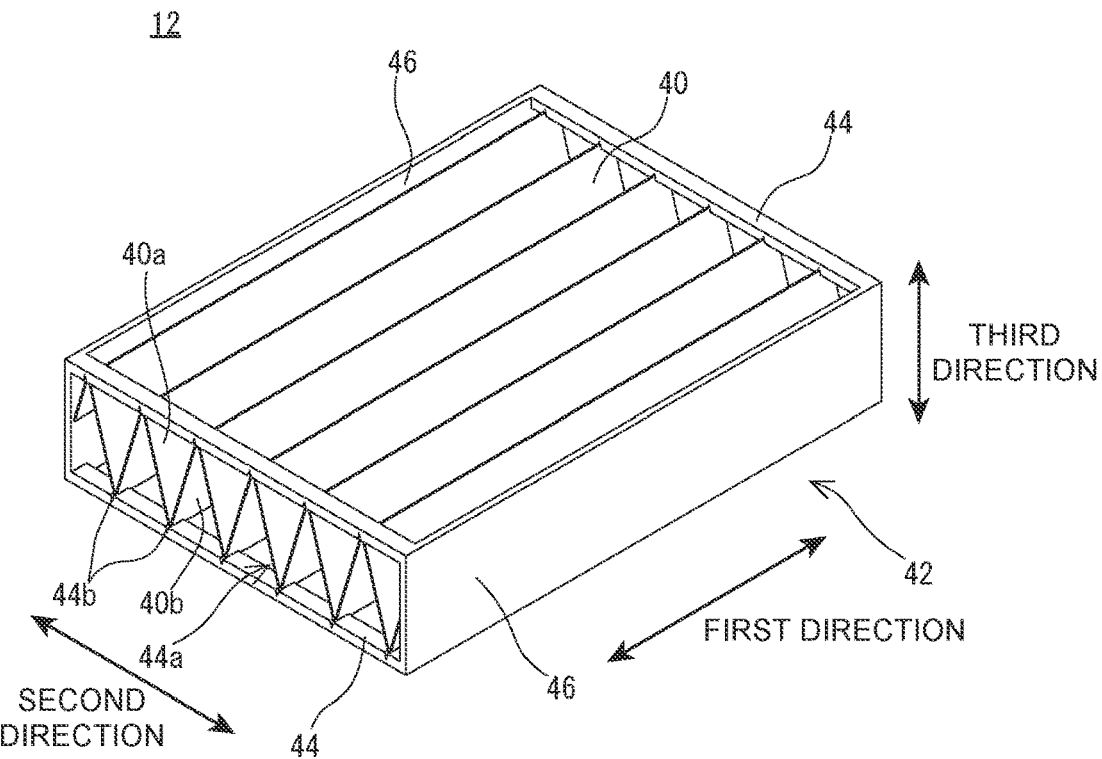
FIG. 9 is a perspective view illustrating still another example of the filter unit.

Additionally, as illustrated in FIG. 9, the first frame 44 can be formed in a rectangular shape instead of a wavy shape. In this case, a plurality of cuts 44b are preferably formed in an inner edge portion of the first frame 44. The projecting ends of the ridge portion 40a and the trough portion 40b of the photocatalytic filter 40 are fitted into the cuts 44b, and thus the wavy shape of the photocatalytic filter 40 can be appropriately held.

Second Embodiment

Figure 11:
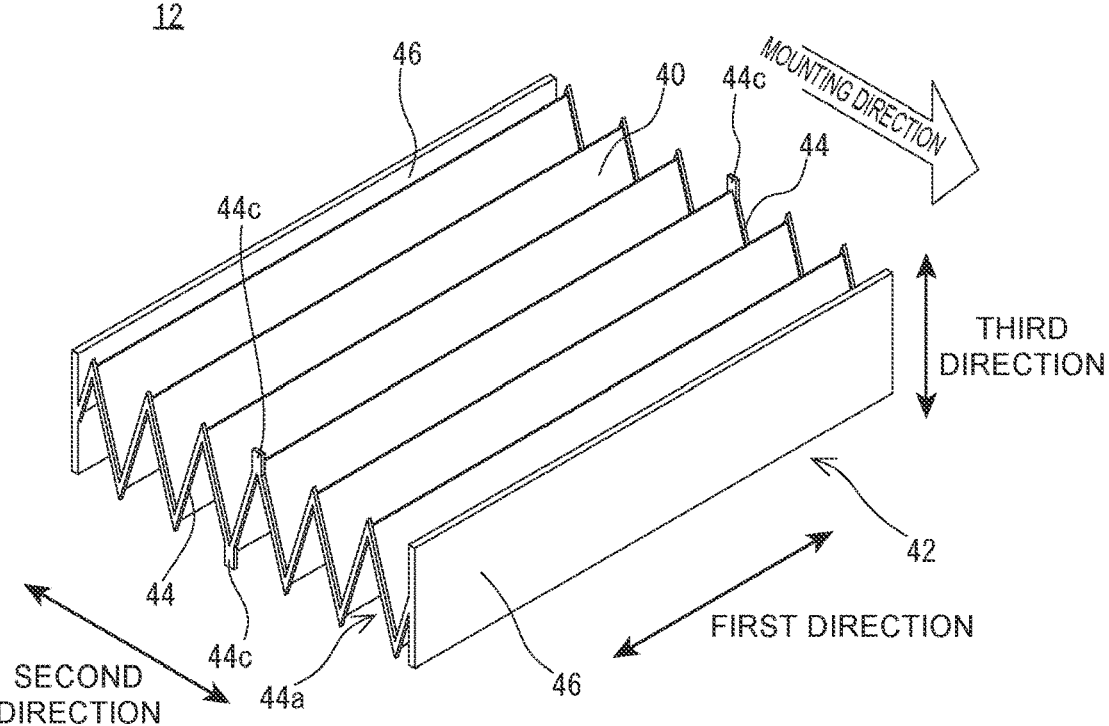
FIG. 11 is a perspective view illustrating the filter unit included in the air purifier according to the second embodiment.
Figure 12:
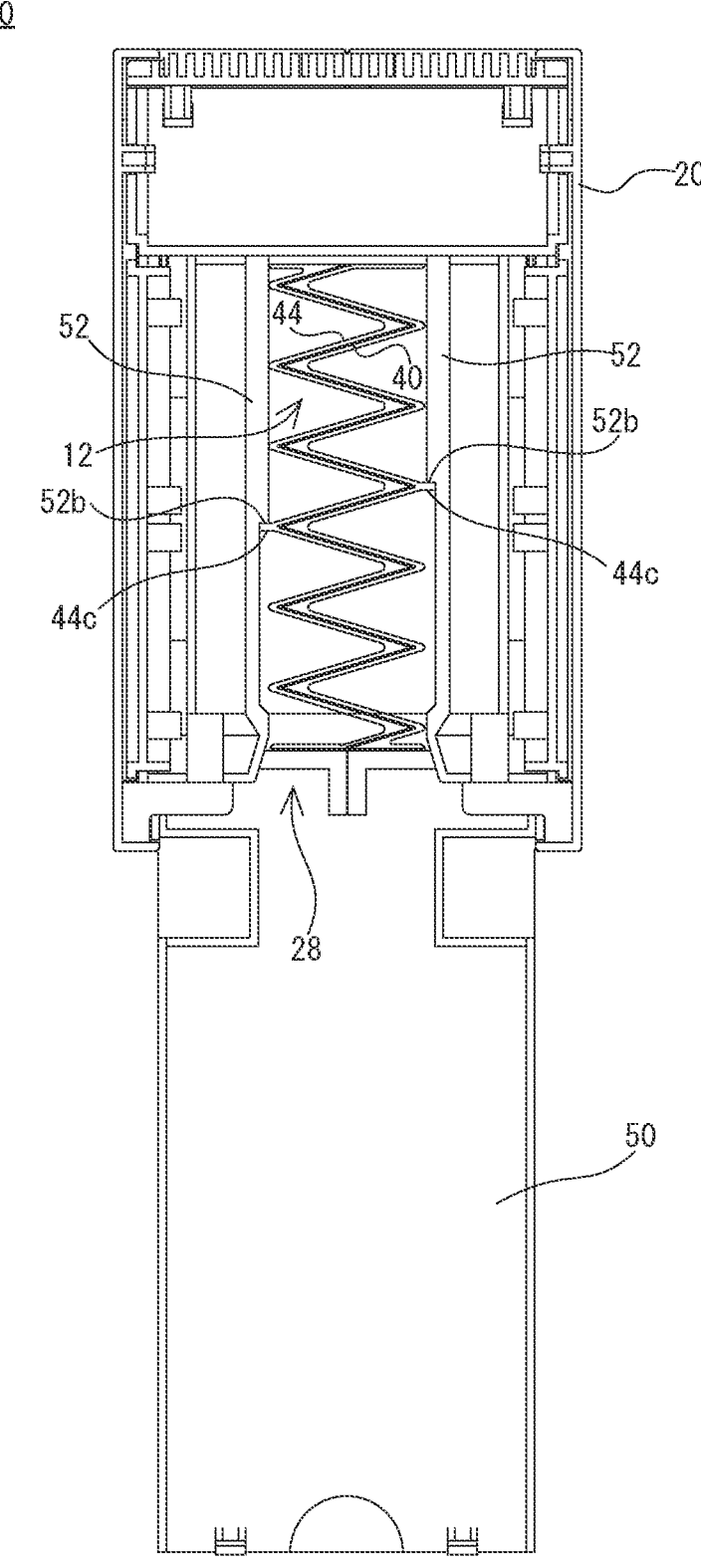
FIG. 12 is a diagram illustrating how to mount the filter unit into a unit housing in the second embodiment.

Next, the air purifier 10 according to a second embodiment of the present disclosure will be described with reference to FIGS. 10 to 12. In the second embodiment, the structures of the unit guide 52 and the first frame 44 are different from those in the aforementioned first embodiment. Since the other components are the same, the components that are common to those according to the aforementioned first embodiment are denoted by same reference numbers, and redundant descriptions will be omitted or simplified.

Figure 10:
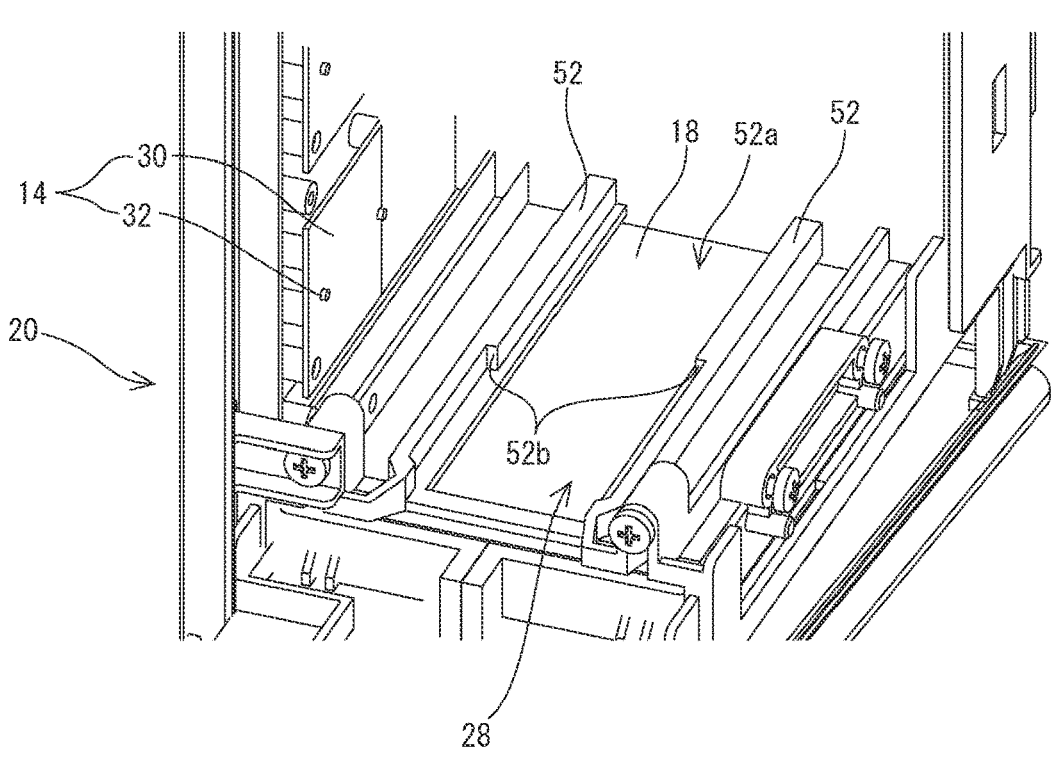
FIG. 10 is a diagram illustrating the surroundings of a unit guide of the air purifier according to a second embodiment of the present disclosure.

As illustrated in FIG. 10, in the second embodiment, the pair of unit guides 52 disposed respectively on the upper end portion and the lower end portion of the unit housing 28 each include an engagement portion 52b formed in the center in an insertion direction of the filter unit 12. Meanwhile, as illustrated in FIG. 11, the first frame 44 include positioning projections 44c each formed at a position corresponding to the engagement portion 52b of the unit guide 52 and projecting outward in the third direction of the photocatalytic filter 40 from the projecting end of the ridge/trough. In addition, as illustrated in FIG. 12, the positioning projection 44c is engaged with the engagement portion 52b in a state where the filter unit 12 is mounted in the unit housing 28, and thus the wave spacing (pitch between the ridges/troughs) of the first frame 44 and the photocatalytic filter 40 is regulated.

Also, in the second embodiment, the contact area of the photocatalytic filter 40 with the air can be increased in the same way as in the first embodiment, and in addition, a pressure loss can be reduced. Therefore, the air can be efficiently purified and the size of the air purifier 10 can be reduced.

Additionally, according to the second embodiment, even in a case where the filter unit 12 (the first frame 44 and the photocatalytic filter 40) has stretchability in the second direction, the wave spacing of the first frame 44 and the photocatalytic filter 40 can be appropriately maintained in a state where the filter unit 12 is mounted in the unit housing 28.

Third Embodiment

Figure 14:
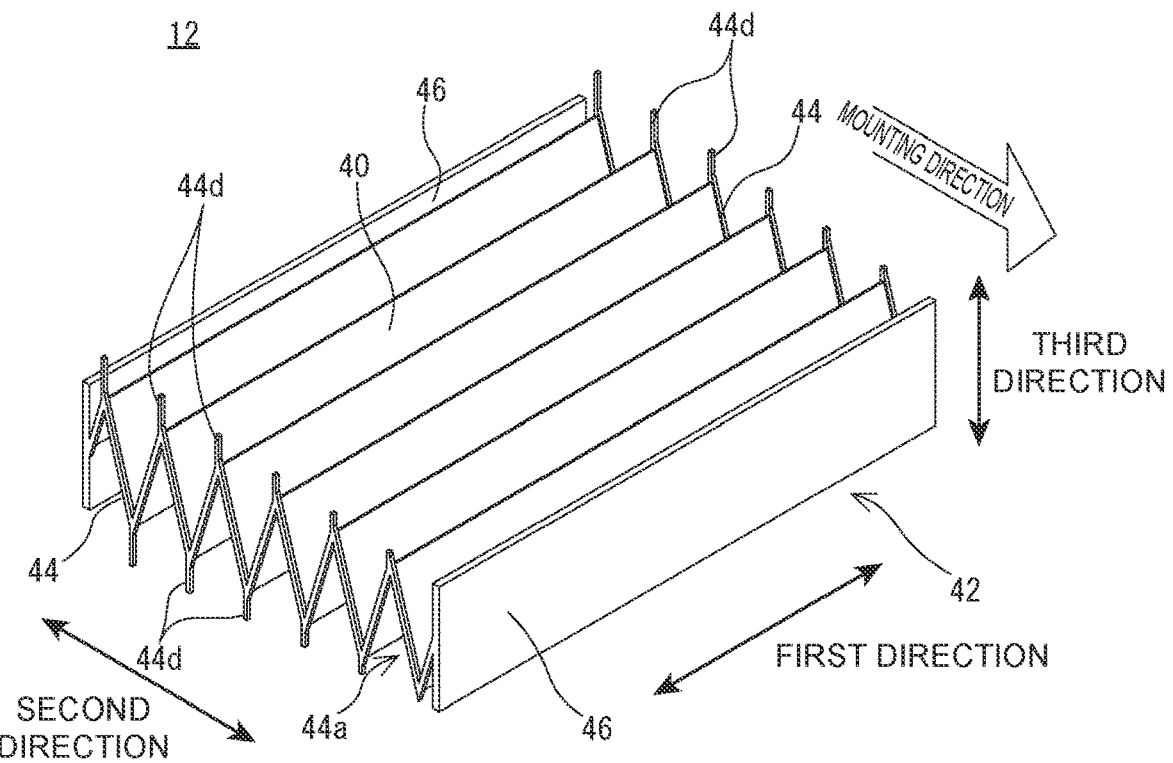
FIG. 14 is a perspective view illustrating the filter unit included in the air purifier according to the third embodiment.
Figure 15:
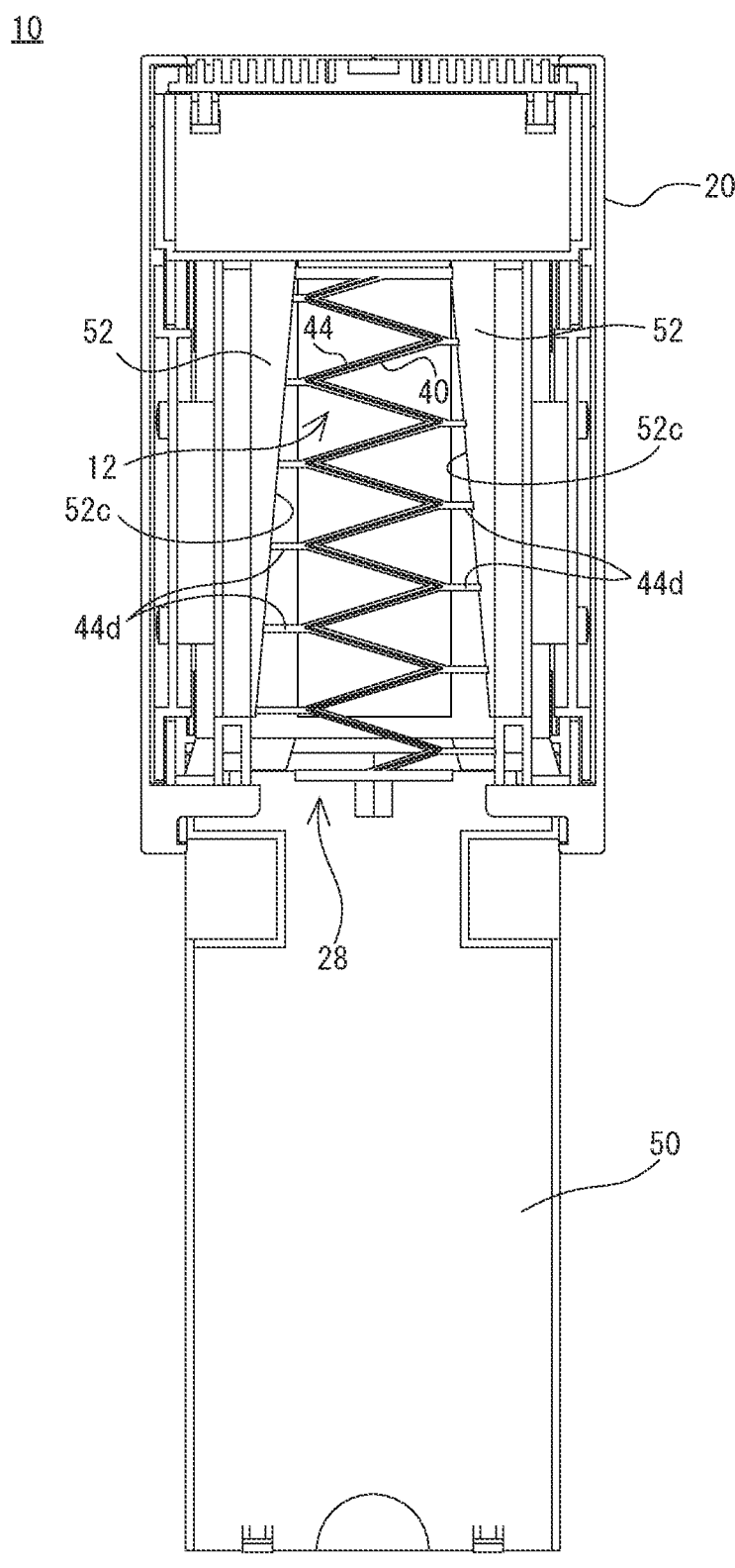
FIG. 15 is a diagram illustrating the filter unit housed in the unit housing in the third embodiment.

Next, the air purifier 10 according to a third embodiment of the present disclosure will be described with reference to FIGS. 13 to 15. In the third embodiment, the structures of the unit guide 52 and the first frame 44 are different from those in the aforementioned first embodiment. Since the other components are the same, the components that are common to those according to the aforementioned first embodiment are denoted by same reference numbers, and redundant descriptions will be omitted or simplified.

Figure 13:
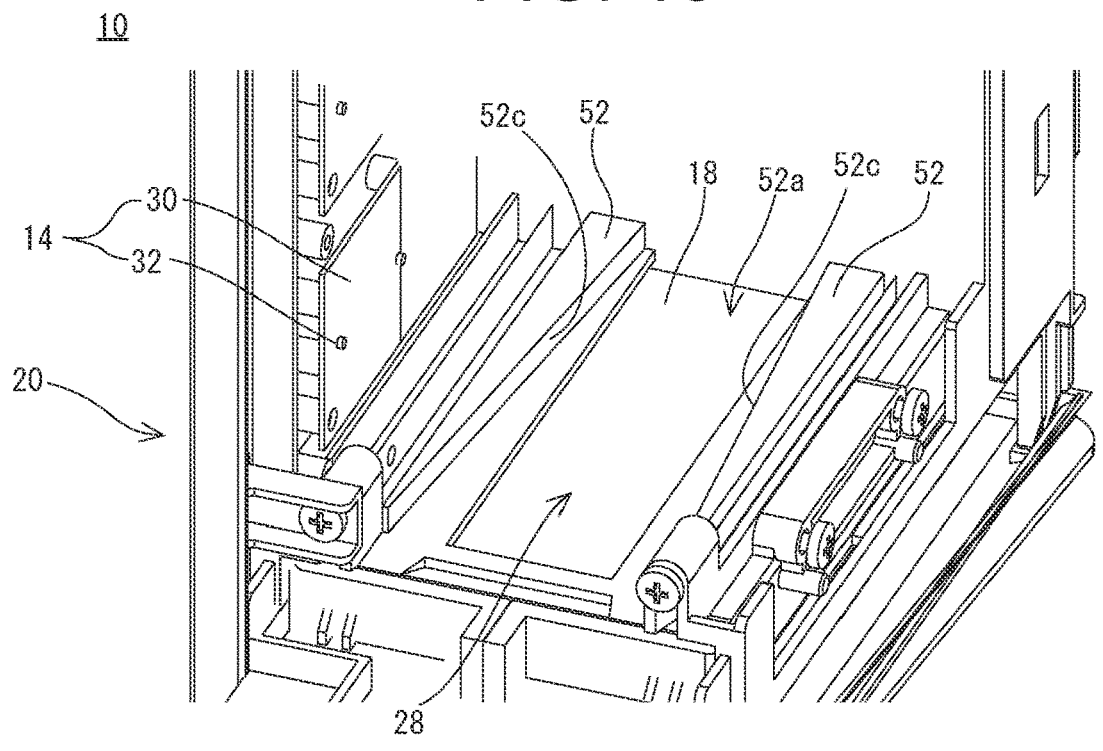
FIG. 13 is a diagram illustrating the surroundings of the unit guide of the air purifier according to a third embodiment of the present disclosure.

As illustrated in FIG. 13, in the third embodiment, the pair of unit guides 52 disposed respectively on the upper end portion and the lower end portion of the unit housing 28 each include an inclined surface 52c formed such that the width thereof (a distance between vertical walls of the unit guide 52) narrows toward the back side in the insertion direction of the filter unit 12. Meanwhile, as illustrated in FIG. 14, the first frame 44 includes positioning projections 44d each formed to project outward in the third direction of the photocatalytic filter 40 from the projecting end of the ridge/trough. The projection length of the positioning projection 44d is set to be decreased toward the back side in the insertion direction of the filter unit 12. In other words, each of the unit guide 52 and the first frame 44 is formed such that the width (the size in the third direction) narrows toward the back side in the insertion direction of the filter unit 12. In addition, as illustrated in FIG. 15, the positioning projections 44d are in contact with the inclined surface 52c of the unit guide 52 in a state where the filter unit 12 is mounted in the unit housing 28, and thus the wave spacing (pitch between the ridges/troughs) of the first frame 44 and the photocatalytic filter 40 is regulated.

Also, in the third embodiment, the contact area of the photocatalytic filter 40 with the air can be increased in the same way as in the first embodiment, and in addition, a pressure loss can be reduced. Therefore, the air can be efficiently purified and the size of the air purifier 10 can be reduced.

Additionally, according to the third embodiment, even in a case where the filter unit 12 has stretchability in the second direction, the wave spacing of the first frame 44 and the photocatalytic filter 40 can be appropriately maintained in a state where the filter unit 12 is mounted in the unit housing 28.

Note that in each of the aforementioned embodiments, the light sources 14 are arranged at both sides of the filter unit 12; however, the light source 14 may be arranged only at one side of the filter unit 12. Further, a reflective plate may be disposed at the side where the light source 14 is not arranged.

Furthermore, in each of the aforementioned embodiments, the flow of air flowing upward is generated by the blast fan 16; however, the flow of air generated by the blast fan 16 can be changed as needed. For example, the filter unit 12 can be arranged transversely such that the flow of air flowing transversely is generated by the blast fan 16 to send the flow of air along the first direction. In other words, the arrangement direction of the filter unit 12 may be either a vertical direction or a transverse direction.

Note that the specific numerical values and shapes of components, etc., described above are merely examples and can be modified as needed according to the product specifications.

What is claimed is:

1. An air purifier that purifies air by using a photocatalytic filter carrying a photocatalyst, the air purifier comprising:

a housing that includes an intake port and an exhaust port;

a filter unit that includes the photocatalytic filter and that is housed in a unit housing within the housing;

a light source that exposes the photocatalytic filter to light; and a blast fan that generates a flow of air passing from the intake port through the unit housing toward the exhaust port, wherein the photocatalytic filter is formed in a wavy shape in which ridge portions and trough portions extending in a first direction are alternately arranged in a second direction orthogonal to the first direction, and the photocatalytic filter is housed in the unit housing such that the flow of air flows along the first direction wherein the filter unit further includes a holding frame, the holding frame has, at both end portions in the first direction of the photocatalytic filter, first frames that keep the wavy shape of the photocatalytic filter, and the first frames includes first openings through which the flow of air passes in the first direction.

2. The air purifier according to claim 1, wherein the filter unit is attachable to, and detachable from, the unit housing, the unit housing includes unit guides supporting the first frames such that the first frames are slidable and guide attachment and detachment of the filter unit, and the unit guides include a second opening in communication with the first openings.

3. The air purifier according to claim 1, wherein the holding frame includes second frames formed in a long plate, disposed both end portions in the second direction of the photocatalytic filter, and extending in the first direction, and the flow of air is restricted by the second frames.

4. The air purifier according to claim 1, wherein the first frames are formed in a wavy shape extending along an end portion of the photocatalytic filter.

5. The air purifier according to claim 4, wherein the unit housing includes unit guides supporting the first frames such that the first frames are slidable and guide attachment and detachment of the filter unit, each of the unit guides includes an engagement portion formed in a center, in an insertion direction, of the filter unit, and the first frames further include positioning projections projecting outward of the photocatalytic filter and engaged with the engagement portions.

6. The air purifier according to claim 4, wherein the unit housing includes unit guides supporting the first frames such that the first frames are slidable and guide attachment and detachment of the filter unit, and each of the unit guides and the first frames is formed such that a width decreases toward a back side, in an insertion direction, of the filter unit.

7. The air purifier according to claim 1, wherein the light source includes a first light source that exposes one main surface of the photocatalytic filter to the light and a second light source that exposes another main surface of the photocatalytic filter to the light.

* * * * *